United States Patent [19]
Ohkouchi et al.

[11] Patent Number: 5,634,274
[45] Date of Patent: Jun. 3, 1997

[54] VENTILATING DEVICE IN POWER DRIVEN TOOL

[75] Inventors: Katsumi Ohkouchi; Makoto Nakabayashi; Tomohiro Hachisuka, all of Anjo, Japan

[73] Assignee: Makita Corporation, Aichi-ken, Japan

[21] Appl. No.: 635,259

[22] Filed: Apr. 12, 1996

[30]   Foreign Application Priority Data

Apr. 14, 1995  [JP]  Japan .................. 7-089624

[51] Int. Cl.$^6$ ............................................ B27B 9/00
[52] U.S. Cl. .................. 30/124; 30/390; 30/391; 451/358; 451/488
[58] Field of Search ..................... 30/123.3, 124, 30/388, 390, 391; 451/358, 359, 488

[56]   References Cited

U.S. PATENT DOCUMENTS

| | | | |
|---|---|---|---|
| 2,989,995 | 6/1961 | Happe | 30/391 |
| 3,873,862 | 3/1975 | Butler | 310/50 |
| 4,612,734 | 9/1986 | Nakajima et al. | 451/358 |
| 5,146,682 | 9/1992 | Blochle et al. | 30/124 |

FOREIGN PATENT DOCUMENTS

| | | | |
|---|---|---|---|
| 977228 | 11/1975 | Canada | 30/124 |
| 1006950 | 4/1957 | Germany . | |
| 1046169 | 12/1958 | Germany . | |
| 3708289 | 9/1987 | Germany | 30/390 |
| 3500371 | 12/1988 | Germany . | |
| 4003029 | 8/1991 | Germany . | |
| 4016774 | 11/1991 | Germany . | |
| 4427426 | 5/1995 | Germany . | |
| 4413723 | 11/1995 | Germany . | |
| 29600191 | 4/1996 | Germany . | |
| 7-31301 | 6/1995 | Japan . | |

*Primary Examiner*—Hwei-Siu Payer
*Attorney, Agent, or Firm*—Dennison, Meserole, Pollack & Scheiner

[57]   ABSTRACT

A ventilating device in a power driven tool has a fan driven by a motor for cooling the motor and has an air flow channel for the air to flow to the outside after passing around the motor. The ventilating device includes an air passage member disposed in the air flow channel on the downstream side of the fan to form a part of the air flow channel. The air passage member includes a plurality of blow windows and a plurality of partition walls for separating the blow windows from each other. The blow windows are positioned in series in the rotational direction of the fan. The partition walls have different heights relative to and in the direction toward the fan such that the heights increase in the rotational direction of the fan.

10 Claims, 5 Drawing Sheets

VENTILATING DEVICE IN POWER DRIVEN TOOL

BACKGROUND OF THE INVENTION

1. Field of the Invention

The present invention relates to a ventilating device for cooling a motor of a power driven tool such as a circular saw, a grinder and a screwdriver.

2. Description of the Prior Art

Conventionally, a ventilating device for cooling a motor of a power driven tool includes a fan driven by the motor disposed within a motor housing. The fan produces flow air which passes around the motor and goes out from an outlet formed in the motor housing or a gear housing positioned on the downstream side of the fan. Such an outlet includes a plurality of elliptical blow windows disposed in series in the rotational direction of the fan. However, when the air flows through the blow windows, air hurtling sounds of the fan may come out through the blow windows and blowing sounds of the cooling air may be produced, so that considerable unpleasant sounds may reach an operator. This may degrade the operation feeling of the tool. To this end, the prior art has proposed to provide partition walls which serve to separate the blow windows from each other such that each of the blow windows has a length in the blowing direction of the air to some extent.

However, the partition walls of the prior art blow windows have the same height with each other in the axial direction of the fan or in the radial direction with respect to the axis of the fan.

With this conventional ventilating device, the cooling air flows transversely of the blow windows at positions adjacent inlets of the blow windows, so that the pressure in the blow windows positioned rearwardly with respect to the rotational direction of the fan tends to become negative, resulting in that the air is sucked into the housing through the blow windows from the outside. For this reason, the cooling air may not be smoothly discharged and the amount of the discharged air is reduced. This may cause the problem that the cooling efficiency of the motor is degraded.

Additionally, since the air is sucked into the housing, such air flowing into the housing may collide with the air flowing transversely of the blow windows, so that a turbulent flow of the air is produced to produce collision sounds.

Further, due to the air flowing transversely of the blow windows, air hurtling sounds may be still produced at the blow windows. Furthermore, since the blow window positioned rearwardly with respect to the rotational direction of the fan has a smaller amount of discharge of the air than that positioned forwardly, a large amount of air flows through the blow window positioned in the frontmost position, so that blow sounds are produced by the air flowing through this blow window.

It is, accordingly, an object of the present invention to provide a ventilating device for cooling a motor of a rotary tool which provides sufficient amount of discharge of a cooling air for improving cooling efficiency of the motor and for improving the silentness of the fan.

It is another object of the present invention to provide such a ventilating device in which the air is dispersed to flow into blow windows by a small amount, respectively, so that the air can be efficiently discharged and that collision sounds, hurtling sounds and blowing sounds of the air can be reduced.

SUMMARY OF THE INVENTION

According to the present invention, there is provided a ventilating device in a power driven tool having a fan driven by a motor for cooling the motor and having an air flow channel for the air to flow to the outside after passing around the motor, comprising:

an air passage member disposed in the air flow channel on the downstream side of the fan to form a part of the air flow channel;

the air passage member including a plurality of blow windows and a plurality of partition walls for separating said blow windows from each other;

the blow windows being positioned in series in the rotational direction of the fan; and the partition walls having different heights relative to and in the direction toward the fan such that the heights increase in the rotational direction of the fan.

With this construction, since the blow windows are separated by the partition walls having different heights relative to and in the direction toward the fan such that the heights increase in the rotational direction of the fan, the air blown by the fan is dispersed to flow into the blow windows by a small amount, respectively, so that the air can be smoothly flown out from the blow windows.

The invention will become more apparent from the appended claims and the description as it proceeds in connection with the drawings.

DETAILED DESCRIPTION OF THE PREFERRED EMBODIMENTS

Figure 1:
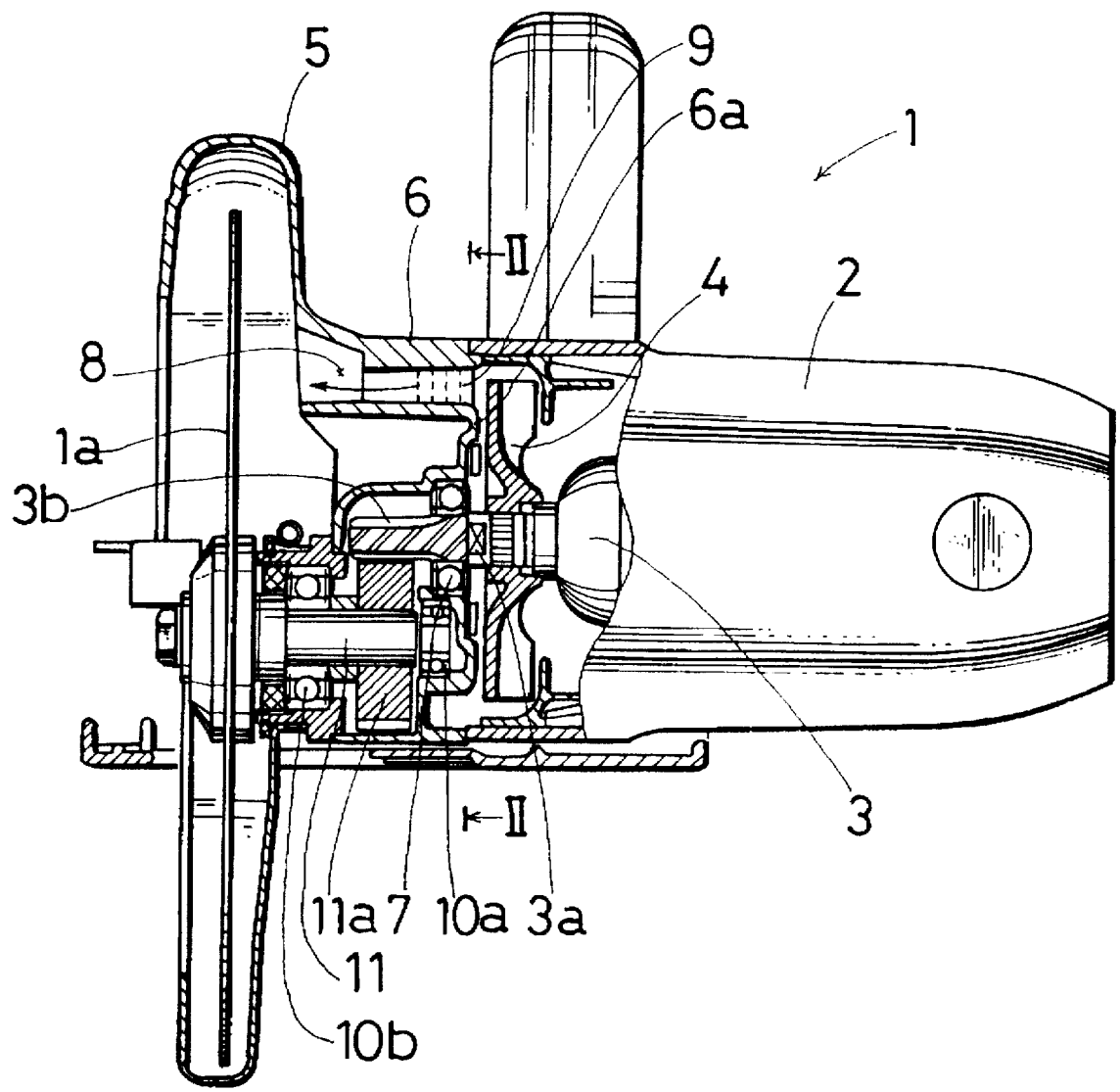
FIG. 1 is a side view, with a part broken away, of a circular saw incorporating a ventilating device according to a first embodiment of the present invention.

A first embodiment of the present invention will now be explained with reference to FIGS. 1 to 3. Referring to FIG. 1, there is shown a circular saw 1 incorporating a ventilating device of the first embodiment. The circular saw 1 has a motor housing 2 in which a motor 3 (only its armature is shown in the drawing) is accommodated. A circular saw blade 1a is driven by the motor 3.

A fan 4 is mounted on an output shaft 3a of the motor 3, so that the fan 4 is rotated when the motor 3 is started. When the fan 4 is rotated, air enters the motor housing 2 from the outside through a suction inlet (not shown) formed in a rear end (rightmost end) of the motor housing 2. The air flows through a space between the motor 3 and the motor housing 2 for cooling the motor 3 and then flows into a gear housing 6 which is fixedly connected to the motor housing 2 and which is positioned forwardly of the motor housing 3. The gear housing 6 is formed integrally with a blade case 5 for partly covering the circular saw blade 1a. The motor housing 2, the gear housing 6 and the blade case 5 cooperate to form an air flow channel for the flow of the air for cooling the motor 3 as will be explained later.

The motor housing 2 and the gear housing 6 are circular in section and having the same diameter with each other. The gear housing 6 has an air passage member 6a which confronts the fan 4 in the axial direction of the output shaft 3a and separate a motor chamber within the motor housing 2 from a gear chamber within the gear housing 6. A bearing 7 is mounted centrally of the air passage member 6a for supporting the output shaft 3a of the motor 3. A pinion 3b is formed integrally with the output shaft 3a and is in engagement with a gear 11a which is mounted on a spindle 11. The circular saw blade 1a is mounted on a front end of the spindle 11. Thus, when the motor 3 is started, the rotation of the output shaft 3a is transmitted to the spindle 11 via the pinion 3b and the gear 11a. The spindle 11 is rotatably supported by the gear housing 6 by means of bearings 10a and 10b. Thus, a power transmission mechanism between the output shaft 3a of the motor 3 and the circular saw blade 1a is disposed within the gear housing 6.

Figure 2:
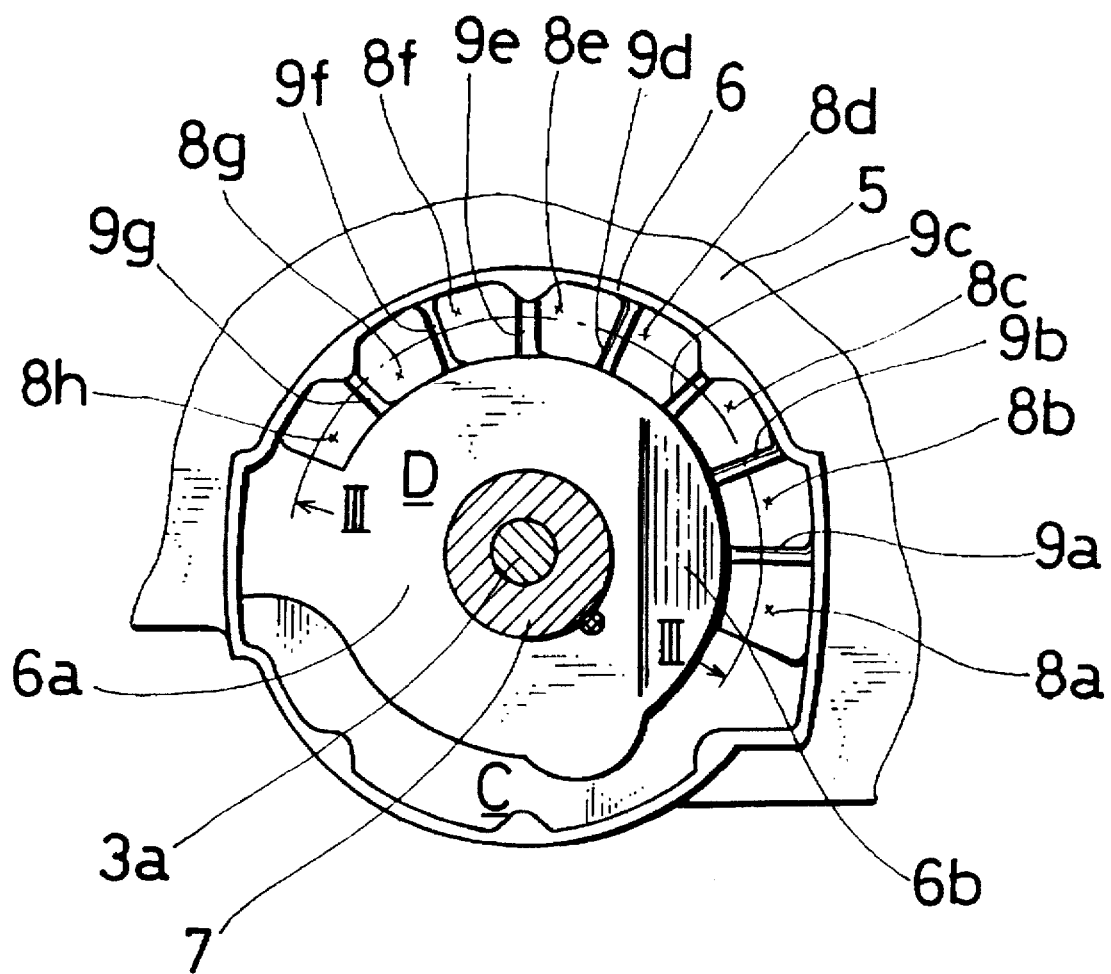
FIG. 2 is a schematic sectional view of the circular saw taken along line II—II in FIG. 1.

As shown in FIG. 2, the air passage member 6a includes blow windows 8a to 8h which are formed therein by an angular range of substantially 180° on the peripheral side of the air passage member 6a. The blow windows 8a to 8h serve to blow the air which has been suctioned into the motor housing 2, into the blade case 5 and are arranged in alphabetical order in the rotational direction of the fan 4 (counterclockwise direction in FIG. 2). Although eight blow windows 8a to 8h are provided in this embodiment, the number of such blow windows is not limited to eight but may be suitably determined as necessary.

The blow windows 8a to 8h are separated from each other by partition walls 9a to 9g and extend in parallel to the output shaft 3a of the motor 3 or the axial direction of the fan 4. The air passage member 6a of the gear housing 6 is configured such that a central surface D has the greatest height and that a peripheral surface part C has the smallest height. Thus, the peripheral surface part C forms a bottom of a recess formed in the periphery of the air passage member 6a. Here, the term "height" means the level relative to and in the direction toward the fan 4. The blow windows 8a to 8h are formed along the periphery of the air passage member 6a in contiguity with the peripheral surface part C.

Figure 3:
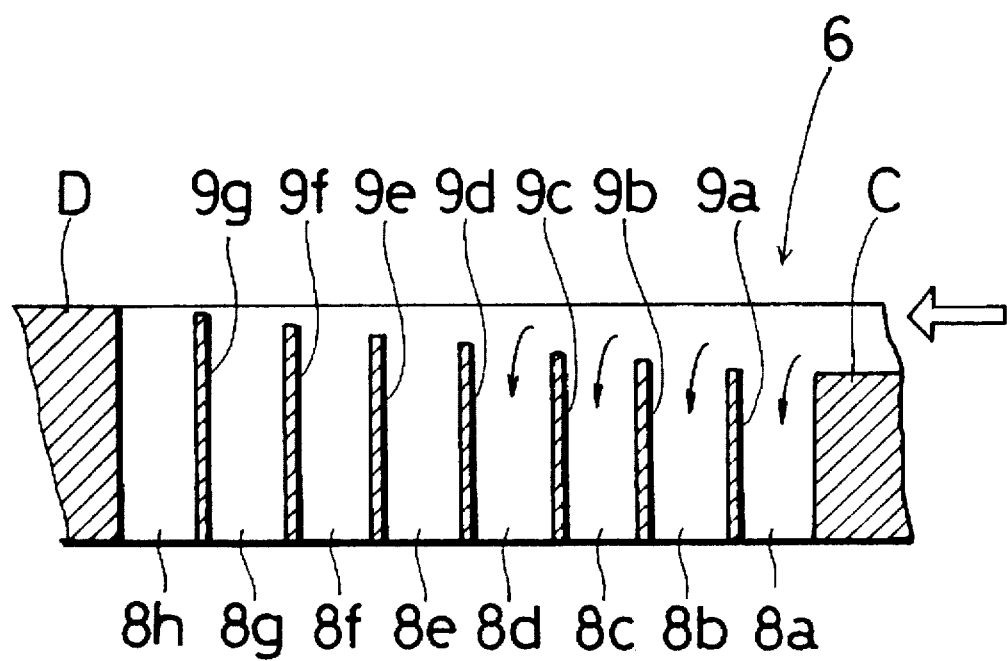
FIG. 3 is a sectional view taken along line III—III in FIG. 2.

In addition, as shown in FIG. 3, the partition walls 9a to 9g have different heights which gradually vary in this order. Thus, the partition wall 9a on the rearmost side in the rotational direction of the fan 4 has the lowest height although this height is greater than the height of the peripheral surface C by a certain extent. The heights of the partition walls 9b to 9g increase step-by-step in the order of 9b-9c-9d-9e-9f-9g in the rotational direction of the fan 4, so that the partition wall 9g on the frontmost side in the rotational direction has the greatest height. However, the height of the partition wall 9g is lower than the central surface D by a certain extent. With this arrangement, a flow channel extending in the counterclockwise direction from one end of the peripheral surface part C to a peripheral part of the central surface D becomes shallower in this direction.

As described above, eight blow windows 8a to 8h are defined by the partition walls 9a to 9g having different heights which gradually vary in the order of the partition walls 9a to 9g, and the blow windows 8a to 8h are open into the blade case 5. Therefore, the air blown by the fan 4 toward the air passage member 6a circulates in the counterclockwise direction along the inner peripheral side of the gear housing 6 while it is blown out forwardly or into the blade case 5 through the blow windows 8a to 8h.

Meanwhile, as shown in FIG. 2, the central surface D includes a surface part 6b which is positioned adjacent the flow channel part extending from one end of the peripheral surface C to the blow windows 8a to 8c. The surface part 6b is inclined (away from the fan 4) in a direction downwardly from the center of the gear housing 6 toward its periphery, so that the air can be smoothly flown into the blow windows 8a to 8c.

With the ventilating device thus constructed, since the partition walls 9a to 9g defining the blow windows 8a to 8h have the different heights which gradually increase in the rotational direction of the fan 4 or the circulating direction of the air, the air is dispersed into a plurality of small amount of flows which enter the blow windows 8a to 8h, respectively, so that the air is efficiently blown into the blade case 5 and that the blowing sounds of the air are reduced. Therefore, the cooling efficiency of the motor 3 as well as the blowing efficiency of the fan 4 can be improved.

Additionally, with this embodiment, the air blown out from the blow windows 8a to 8h is not directly discharged to the outside but is discharged after passing through the blade case 5. Thus, the wind force of the blowing air is weakened at the blade case 5 and the hurtling sounds (blowing sounds) may be confined in the blade case 5. Therefore, the hurtling sounds may be substantially reduced in comparison with the case that the air is directly discharged to the outside. Consequently, the circular saw 1 may have a substantially improved silentness and may provide an excellent operation feeling. In addition, since the air may not be blown toward the operator of the circular saw 1, the operation feeling can be further improved.

As described above, with this embodiment, since the partition walls 9a to 9g defining the blow windows 8a to 8h have the different heights which gradually increase in the circulating direction of the air, the air is dispersed to enter the blow windows 8a to 8h with excellent balance of amount of air, so that the air smoothly enters the blade case 5 to improve silentness of the circular saw 1. Further, since the wind force is weakened in the blade case 5 and since the hurtling sounds may be confined in the blade case 5, the blowing sounds may be further reduced.

Although in the above embodiment, the gear housing 5 and the blade case 6 are formed integrally with each other, they may be of separate members. Further, the gear housing 5 as well as the motor housing may be formed by two halves.

Figure 4:
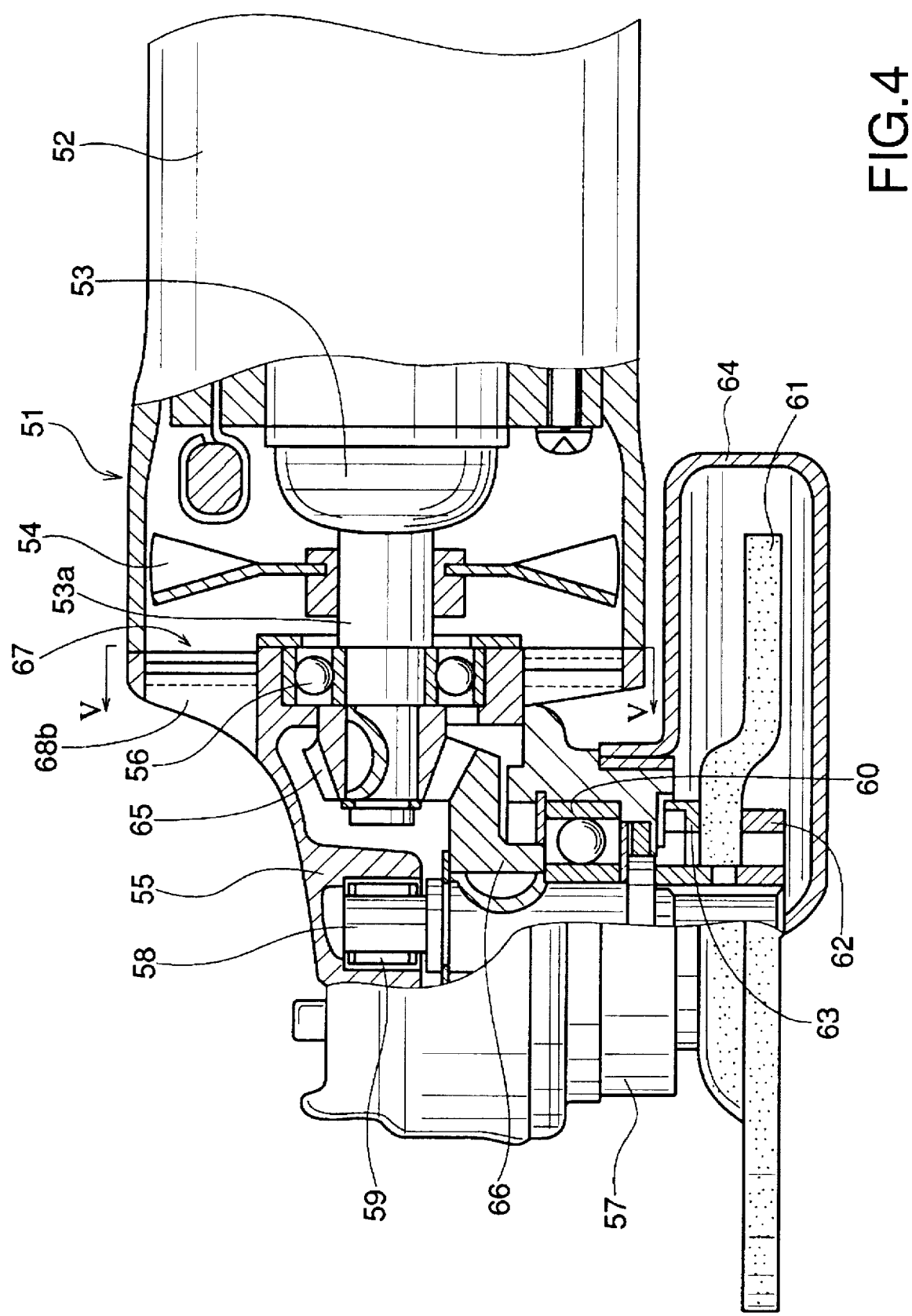
FIG. 4 is a side view, with a part broken away, of the essential parts of a grinder incorporating a ventilating device according to a second embodiment of the present invention.
Figure 5:
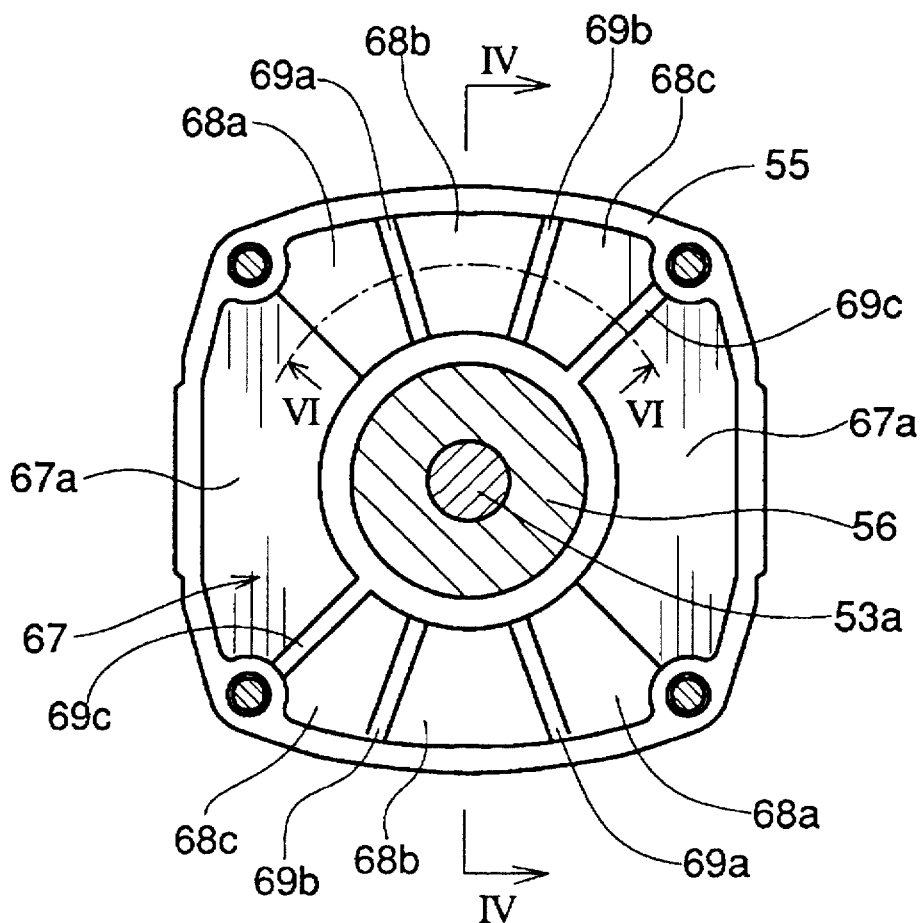
FIG. 5 is a schematic sectional view of the grinder taken along line V—V in FIG. 4.

A second embodiment of the present invention will now be described with reference to FIGS. 4 to 6. Referring to FIG. 4, there is shown the essential parts of a grinder 51 incorporating a ventilating device according to the second embodiment.

The grinder 51 includes a motor housing 52 for accommodating a motor 53. The motor 53 has an output shaft 53a on which a fan 54 is fixedly mounted. The motor housing 52 has an air suction hole (not shown) formed in its rear portion.

A gear housing 55 is fixedly mounted on the motor housing 52 and is positioned forwardly of the same. The output shaft 53a of the motor 53 is supported by the gear housing 55 by means of a bearing 56. The motor housing 52 and the gear housing 55 cooperate to form an air flow channel for cooling the motor 53 as will be explained later.

A bearing box 57 is fixedly mounted on the lower portion of the gear housing 55. A spindle 58 extends vertically between the gear housing 55 and the bearing box 57 and is positioned perpendicular to the output shaft 53a of the motor 53. The spindle 58 has an upper end supported by the gear housing 55 by means of a bearing 59 and has a middle portion supported by the bearing box 57 by means of a bearing 60. The spindle 58 has a lower end extending downwardly from the bearing box 57. A grinding wheel 61 is detachably mounted on the lower end of the spindle 58 by means of a nut 62 and a flange member 63. A wheel cover 64 is fixedly mounted on the lower portion of the bearing box 57 so as to partly cover the grinding wheel 61.

Within the gear housing 55, a bevel gear 65 is keyed on a forward end of the output shaft 53a, and a bevel gear 66 is keyed on the spindle 58. The bevel gear 66 is in engagement with the bevel gear 65 and has a larger number of teeth than those of the bevel gear 65.

The gear housing 55 has an air channel member 67 which confronts the fan 54 in the axial direction of the fan 54 and which constitutes a mounting portion of the bearing 56 for supporting the output shaft 53a of the motor 53. As shown in FIG. 5, a pair of groups of blow windows 68a to 68c are formed in the air channel member 67 and are positioned vertically symmetrically with each other with respect to the output shaft 53a. Each group of blow windows 68a to 68c are positioned in series in the rotational direction of the fan 54 (clockwise direction in FIG. 5) in the order of 68a-68b-68c within the angular range of substantially 90°. The blow windows 68a and 68b are separated by a partition wall 69a, and the blow windows 68b and 68c are separated by a partition wall 69b, so that the blow windows 68a to 68c extend in parallel to the axial direction of the output shaft 53a. The air passage member 67 has a pair of wall portions 67a positioned between the groups of blow windows 68a to 68c, so that each of the wall portions 67a defines a front wall of the blow window 68a and a rear wall of the blow window 68c. Here, each of the wall portions 67a has a partition wall 69c which forms the rear wall of the blow window 68c. The blow windows 68a to 68c are in direct communication with the outside.

Figure 6:
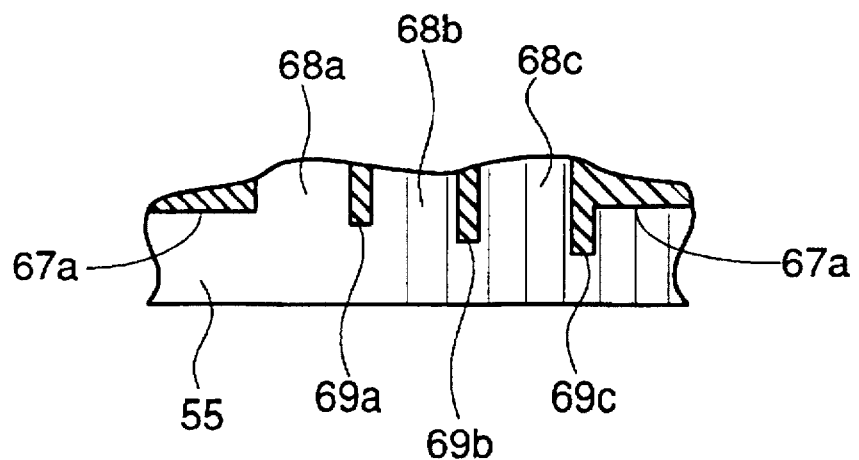
FIG. 6 is a sectional view taken along line VI—VI in FIG. 5.

As shown in FIG. 6, as with the partition walls 9a to 9g of the first embodiment, the partition walls 69a to 69c have different heights which increase in the rotational direction of the fan 54 in the order of 69a-69b-69c. It is to be noted that, in FIG. 4, the air passage member 67 is shown in sectional view taken along line IV—IV in FIG. 5.

In operation, when the fan 54 is rotated by starting the motor 53, air enters the motor housing via the suction hole and flows around the motor 53 for cooling the same. The air is thereafter discharged to the outside through the blow windows 68a to 68c. Since the partition walls 69a to 69c have different heights increasing in the rotational direction of the fan 54, in the same manner as the first embodiment, the air is dispersed into a plurality of small amount of flows which enter the blow windows 68a to 68c, respectively, so that the air is efficiently blown out to the outside and that the blowing sounds of the air are reduced. Therefore, the cooling efficiency of the motor 53 as well as the blowing efficiency of the fan 54 can be improved.

In addition, with this embodiment, since two groups of blow windows 68a to 68c are provided in a symmetrical relationship with respect to the output shaft 53a, the air may be blown out to the outside with further excellent balance of amount of air, so that the above advantages may be further enhanced.

Although the present invention has been embodied in the circular saw and the grinder in the first and the second embodiments, respectively, the present invention may be incorporated into any other power driven tools such as a screwdriver and a drill as long as they incorporate fans for producing flow of the air for cooling motors.

Additionally, although in the second embodiment, the air is directly discharged to the outside through the blow windows, the air may be discharged via the wheel cover, so that the same effect as obtained in the construction of discharging the air to the outside via the blade case in the first embodiment can be obtained.

Further, although in the above first and second embodiments, each of the blow windows extends in the direction parallel to the axial direction of the fan, the blow windows may be inclined in the rotational direction of the fan to some extent by tilting the partition walls.

Furthermore, although in the above first and second embodiments, the air passage member confront the fan in the axial direction of the fan, the air passage members may confront the fan in the radial direction of the fan, so that the blow windows are open in the radial direction.

While the invention has been described with reference to preferred embodiments thereof, it is to be understood that modifications or variations may be easily made without departing from the spirit of this invention which is defined by the appended claims.

What is claimed is:

1. In a power driven tool having a fan driven by a motor, the improvement comprising:
    a blow window structure positioned to confront the fan in an axial direction of the fan, said blow window structure including:
    a plurality of windows positioned in series in the rotational direction of the fan and open in the axial direction of the fan; and
    a plurality of partition walls separating said windows from each other;
    said partition walls having different heights relative to and in the direction toward the fan such that the heights increase in the rotational direction of the fan.

2. The power driven tool of claim 1 wherein said windows extend over an angular range of at least substantially 90°.

3. The power driven tool of claim 2 wherein said angular range is substantially 180°.

4. A ventilating device in a power driven tool having a fan driven by a motor for cooling the motor and having an air flow channel for the air to flow to the outside after passing around the motor, comprising:
    an air passage member disposed in the air flow channel on a downstream side of the fan opposite said motor and axially aligned with said fan to form a part of the air flow channel;
    said air passage member including a plurality of blow windows open in the axial direction of the fan and a plurality of partition walls separating said blow windows from each other;
    said blow windows being positioned in series in the rotational direction of the fan; and
    said partition walls having different heights relative to and in the direction toward the fan such that the heights increase in the rotational direction of the fan.

5. The ventilating device in the power driven tool as defined in claim 1 wherein said blow windows are formed in series in a peripheral portion of said air passage member.

6. The ventilating device in the power driven tool as defined in claim 5 wherein said blow windows are formed in said air passage member within a predetermined angular range in the rotational direction of said fan.

7. The ventilating device in the power driven tool as defined in claim 6 wherein a groove is formed in said air passage member within a second predetermined angular range and is positioned in series with and rearwardly of said blow windows in the rotational direction of the fan, said groove including a bottom surface having a height in the direction toward the fan, the height of said bottom surface being equal to or lower than the height of one of said partition walls having the lowest height.

8. The ventilating device in the power driven tool as defined in claim 1 wherein the fan is fixed to an output shaft of the motor and said air passage member comprising a mounting portion of a bearing for supporting said output shaft.

9. The ventilating device in the power driven tool as defined in claim 1 wherein the air flow channel includes a chamber positioned on the downstream side of said air passage member, said chamber serving to weaken a wind force of the air flowing from said air passage member to the outside.

10. The ventilating device in the power driven tool as defined in claim 9 wherein the power driven tool is a circular saw and wherein said chamber is formed by a blade case for covering a saw blade of the circular saw.

\* \* \* \* \*

UNITED STATES PATENT AND TRADEMARK OFFICE
CERTIFICATE OF CORRECTION

PATENT NO. : 5,634,274
DATED : June 3, 1997
INVENTOR(S) : Katsumi OHKOUCHI et al It is certified that error appears in the above-indentified patent and that said Letters Patent is hereby corrected as shown below:

Column 6, line 66, "claim 1" should read --claim 4--;

Column 7, last line, "claim 1" should read --claim 4--;

Column 8, line 5, "claim 1" should read --claim 4--.

Signed and Sealed this

Twenty-ninth Day of July, 1997

Attest:

BRUCE LEHMAN

*Attesting Officer*     *Commissioner of Patents and Trademarks*